(12) United States Patent
McKenzie (10) Patent No.: US 9,610,524 B2
(45) Date of Patent: *Apr. 4, 2017

(54) SEPARATOR FOR A GAS STREAM

(71) Applicant: Robert McKenzie, Wetaskiwin (CA)

(72) Inventor: Robert McKenzie, Wetaskiwin (CA)

( * ) Notice: Subject to any disclaimer, the term of this patent is extended or adjusted under 35 U.S.C. 154(b) by 141 days.

This patent is subject to a terminal disclaimer.

(21) Appl. No.: 13/849,659

(22) Filed: Mar. 25, 2013

(65) Prior Publication Data

US 2013/0255206 A1 Oct. 3, 2013

Related U.S. Application Data

(60) Provisional application No. 61/619,081, filed on Apr. 2, 2012.

(51) Int. Cl.
| | | |
|---|---|---|
| *B01D 45/08* | (2006.01) | |
| *B01D 45/12* | (2006.01) | |
| *B01D 45/16* | (2006.01) | |
| B01D 46/00 | (2006.01) | |
| A47L 9/16 | (2006.01) | |

(52) U.S. Cl.
CPC ............ *B01D 45/08* (2013.01); *B01D 45/12* (2013.01); *B01D 45/16* (2013.01); *A47L 9/1683* (2013.01); *B01D 46/0031* (2013.01)

(58) Field of Classification Search
CPC ........ B01D 45/16; B01D 45/08; B01D 45/12; B01D 46/0031; A47L 9/1683
USPC ...................... 55/463, 423, 456, 457; 95/269
See application file for complete search history.

(56) References Cited

U.S. PATENT DOCUMENTS

| | | | |
|---|---|---|---|
| 1,066,704 A | | 7/1913 | Brassert |
| 2,147,671 A | * | 2/1939 | Pratt ...................... B01D 45/16 138/42 |
| 2,346,005 A | | 4/1944 | Bryson |
| 2,574,370 A | | 11/1951 | Bailey |
| 3,182,748 A | * | 5/1965 | Wirt ........................ F01D 25/30 181/280 |
| 3,300,951 A | | 1/1967 | Sorg et al. |
| 3,813,854 A | * | 6/1974 | Hortman ................ B01D 45/16 55/399 |
| 3,822,533 A | | 7/1974 | Oranje |

(Continued)

FOREIGN PATENT DOCUMENTS

| | | |
|---|---|---|
| CA | 1096814 | 3/1981 |
| CA | 2270152 | 8/1998 |

(Continued)

*Primary Examiner* — Dung H Bui
(74) *Attorney, Agent, or Firm* — Davis & Bujold PLLC; Michael J. Bujold (57) ABSTRACT

A separator for a wet gas stream has an upper section having an outer peripheral wall, a top, and a bottom perforated baffle. A cone-shaped baffle is positioned on the perforated bottom baffle and extending toward the inlet in the top of the upper section. A spiral baffle has a bottom edge adjacent to the cone-shaped baffle and a top edge adjacent to the top of the upper section. The spiral baffle defines a curved flow path between the inlet and the outlet of the upper portion. A vortex flow section is defined by the cone-shaped baffle and the outer peripheral wall. The vortex flow section is fed by the curved flow path defined by the cone-shaped baffle. A lower section is below the perforated baffle. The lower section has a gas outlet and a liquid outlet.

4 Claims, 7 Drawing Sheets

(56) References Cited

U.S. PATENT DOCUMENTS

| | | | |
|---|---|---|---|
| 3,955,948 A | | 5/1976 | Campolong |
| 4,141,705 A | | 2/1979 | Campolong |
| 4,255,174 A | | 3/1981 | Simpson |
| 4,477,271 A | * | 10/1984 | Iwasyk .................. B01D 45/16 138/37 |
| 4,556,542 A | * | 12/1985 | Sayles ...................... B01J 8/005 422/147 |
| 4,622,048 A | * | 11/1986 | Roberts et al. ................. 96/188 |
| 7,691,185 B2 | | 4/2010 | Darke et al. |
| 7,799,106 B2 | | 9/2010 | Rother et al. |
| 2007/0220850 A1 | * | 9/2007 | Thompson ...................... 55/457 |

FOREIGN PATENT DOCUMENTS

| | | | | |
|---|---|---|---|---|
| EP | 0344749 A2 | | 12/1989 | |
| WO | WO 9835744 A1 | * | 8/1998 | ............. B01D 46/30 |
| WO | 2006132527 A1 | | 12/2006 | |

* cited by examiner

SEPARATOR FOR A GAS STREAM

BACKGROUND

Traditionally, gas streams are dried using chemicals, such as glycol, or using separators that remove moisture using filtering or mechanical separation. An example of a filtering separator can be found in Canadian patent application no. 2,270,152 (McKenzie et al.) entitled "Apparatus and method for removing entrained liquid from gas or air."

SUMMARY

There is provided a separator for a wet gas stream, comprising: an upper section having an outer peripheral wall, a top, and a bottom, the bottom comprising a perforated baffle, the top having a gas inlet, and the perforated baffle defining a gas outlet. A cone-shaped baffle is positioned on the perforated bottom baffle and extends toward the inlet in the top of the upper section. There is a spiral baffle having a bottom edge adjacent to the cone-shaped baffle and a top edge adjacent to the top of the upper section. The spiral baffle defines a curved flow path between the inlet and the outlet of the upper portion. A vortex flow section is defined by the cone-shaped baffle and the outer peripheral wall. The vortex flow section is fed by the curved flow path defined by the cone-shaped baffle. A lower section is below the perforated baffle. The lower section has a gas outlet and a liquid outlet.

According to another aspect, the cone-shaped baffle defines an inner cavity in fluid communication with the lower section.

According to another aspect, a cylindrical flange extends downward from the cone-shaped baffle into the lower section. The gas outlet comprises a conduit that terminates within the cylindrical flange.

According to another aspect, the baffle is a grill.

According to another aspect, the upper section comprises a liquid collecting medium positioned toward the outer peripheral wall of the upper section. The liquid collecting medium may be a mist pad. The bottom of the upper section may comprise liquid openings into the lower section below the liquid collecting medium. The lower section may comprise an outer baffle extending from the bottom of the upper section and positioned between the liquid openings and opening in the perforated baffle.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A separator for a gas stream generally identified by reference numeral 10 will now be described with reference to FIG. 1 through FIG. 4.

Structure and Relationship of Parts

Figure 1:
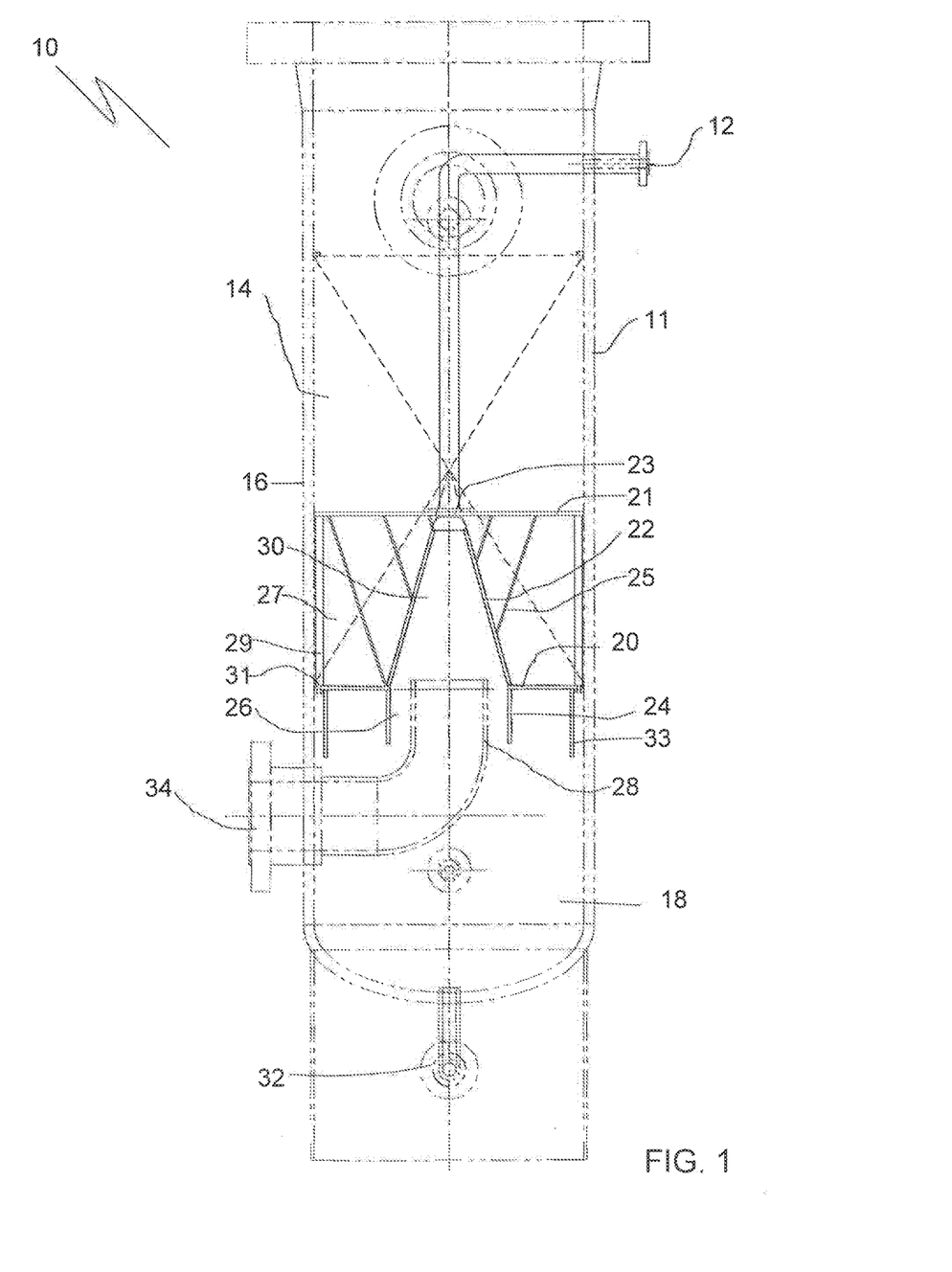
FIG. 1 is a side elevation view, in section, of a separator for a gas stream.
Figure 2:
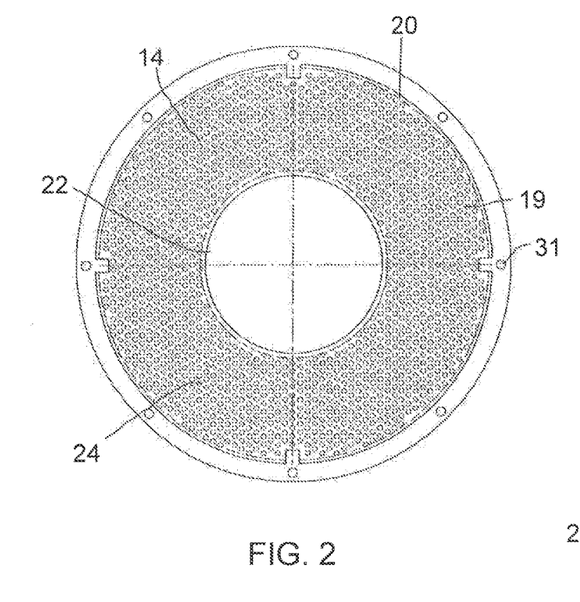
FIG. 2 is a top plan view, in section, of a separator for a gas stream.
Figure 3:
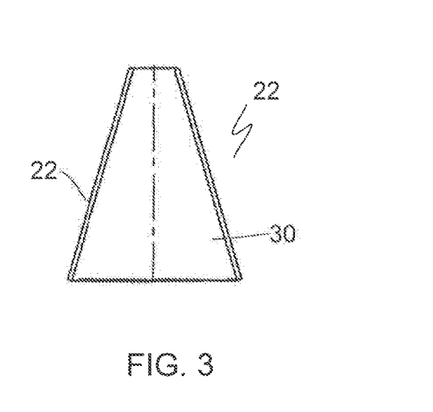
FIG. 3 is a side elevation view of a cone-shaped baffle found in the separator for a gas stream shown in FIG. 1.

Referring to FIG. 1, separator 10 has a tank 11 with a peripheral sidewall 16, which encloses an upper, separation section 14 and a lower, collection section 18. Tank 11 has an inlet 12 through which the gas stream which is a gas/liquid mixture, enters and is connected to the separation area 14. Generally, the liquid in the gas stream that is being removed is preferably water, or mostly water. A perforated baffle 20, such as a grill or a perforated plate 24 as shown in FIG. 2, forms the bottom of upper section 14 and separates the upper section 14 from the lower section 18. Referring to FIG. 1, the baffle 20 surrounds a cone-shaped baffle 22 that extends into the separation area 14. As the teachings contained herein are understood, it will be understood that cone-shaped baffle 22 need not be a perfect geometric cone, and that a cone-like shape is sufficient, for example, with the radius of cone-shaped baffle 22 reducing as it extends away from perforated baffle 20. Furthermore, while cone-shaped baffle 22 is shown in FIG. 3 as being hollow with an opening from lower section 18, cone-shaped baffle 22 may be solid, or may be positioned on baffle 20 that may not have an opening. It will also be understood that perforated baffle 20 may be formed in different ways. For example, instead of perforating a solid plate, baffle 20 may be formed using a mesh.

Figure 4:
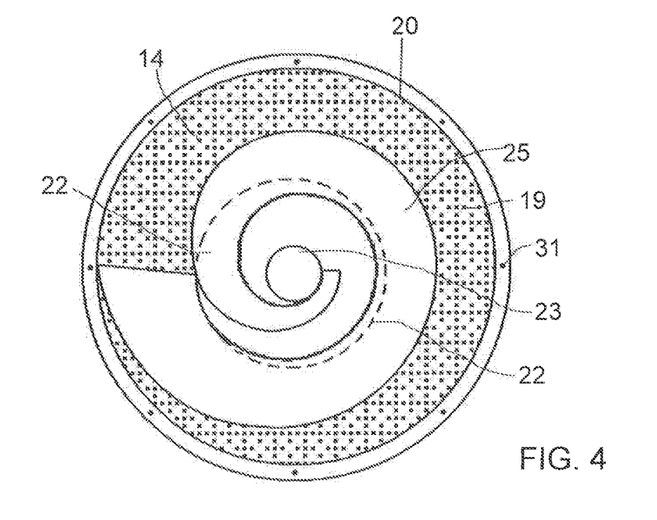
FIG. 4 is a top plan view, in section, of the separator for a gas stream.

The separation area 14 is covered by a top plate 21 that has an opening 23 connected to inlet 12. Referring to FIGS. 1 and 4, a spiral baffle 25 is mounted on the cone-shaped baffle 22. Spiral baffle 25 begins at the top of cone-shaped baffle 22, and is angled outward. The bottom edge of spiral baffle 25 spirals outward as it travels down cone-shaped baffle 22, while the top edge of spiral baffle spirals outward along top plate 21. As depicted, spiral baffle 25 ends when the bottom edge reaches the bottom of cone-shaped baffle 22, and the top edge reaches peripheral sidewall 16, in about 1½ turns. It will be understood that he actual design of spiral baffle 25 may vary depending on the preferences of the user and the design requirements, while still allowing the purpose to be satisfied. Opening 23 is depicted as being aligned with the center of spiral baffle 25, such that it causes the inlet gas to flow in a vortex or vortex-like flow path as it flows downward and approaches perforated baffle 20. Referring to FIG. 1, spiral baffle 25 defines a vortex flow area 27 bounded on the top by spiral baffle 25, on the bottom by perforated baffle 20, and on the sides by outer peripheral sidewall 16 of tank 11. The movement of gas in this manner induces separation of any fluid in the gas stream, and also forces the gas/liquid mixture toward the peripheral sidewall 16.

Preferably, there is a liquid collection medium 29 positioned adjacent to outer wall 16 that leaves flow area 27 relatively unobstructed. Liquid collection medium is used to enhance collection of liquid from the gas stream. Liquid collection medium 29 is preferably a mist pad, such as a pad made from a mesh of stainless steel on other substances. Medium 29 may take other forms as well, such as particulate matter. Referring to FIGS. 1 and 2, perforated baffle 20 preferably has liquid flow ports 31 below liquid collection medium 29, such that the collected liquid captured by liquid collection medium 29 is permitted to flow down through flow ports 31 into lower section 18, while the dried gas passes substantially through perforations 19 in perforated baffle 20. Referring to FIG. 1, a peripheral baffle 33 may be mounted in lower section 18 below perforated baffle 20 between flow ports 31 and perforations 19 to prevent contact between the separated gas and liquid.

A cylindrical flange 24 extends downward from the baffle 20 to form a cavity 26. The cylindrical flange 24 is preferably an extension of the cone-shaped baffle 22 that receives a pipe 28 with a vertical section into an interior 30 of the cone-shaped baffle 22 in the upper separation section 14. Referring to FIG. 4, particulate matter 23 in the separation section 14 adsorbs liquid from the gas stream. Particulate matter 23 is preferably any material that is at least partially hydrophyllic. In one example, gravel may be used as a readily available, inexpensive material. Referring to FIG. 1, the particulate matter 23 is supported within the upper separation section 14 by the baffle 20 and the peripheral sidewall 16. The adsorbed liquid and gas stream flow through the baffle 20 into the lower collection section 18. A liquid outlet 32 toward the bottom of the lower section 18 is used to remove separated liquids from the tank and a gas outlet 34 toward the top of the lower section 18 is used to remove separated gases from the tank. Outlet 32 preferably includes a dump valve to remove the fluid once a certain level has been reached. The gas outlet 34 includes a pipe 28 that has an opening that extends into the cavity 26 formed by a cylindrical flange 24.

Operation:

Referring to FIG. 1, the gas stream to be dried is received by separator 10 through the inlet 12. The gas flows through opening 23 in top plate 21 into separation section 14 and comes into contact with spiral baffle 25. Spiral baffle 25 directs the gas into a spiral flow path, such that a vortex flow path is achieved in flow area 27. This causes liquid in the gas to separate out, and it is substantially collected along peripheral sidewall 16. Liquid collection medium 29 may be used to assist in this separation and collection. The water that is collected along peripheral sidewall 16 flows downward through the baffle 20 via fluid ports 31 at the bottom of the separation section 14 and collects in the bottom of the lower section 18. The liquid is removed through the liquid output 32, for example by using a dump valve. The gas stream also flows down through the baffle 20 and is forced into the upper portion of the lower section 18 within the cone-shaped baffle 22 and then out the gas output 34. The tortuous flow path in lower section 18 created by cylindrical flange 24 and pipe 28 helps ensure that liquid remains in the tank as the gas flow through gas output 34.

Example

Figure 5:
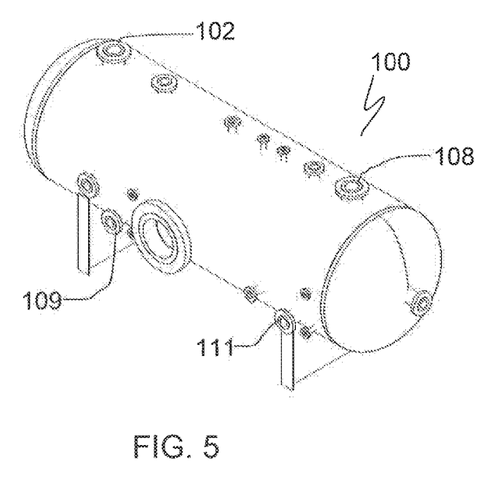
FIG. 5 is a perspective side view of a phase separator that works in combination with the separator for a gas stream shown in FIG. 1.

An example of how the separator may be used will now be described with reference to FIG. 5 through 15. Separator 10 may be used in series with other separators for drying a gas stream. FIG. 5 through 8 depict an example of a possible progression of separators. Referring to FIG. 5, a common three-phase separator 100 may be used as the first stage of the separation process. Referring to FIG. 9, a schematic of a generic three-phase separator is shown, where production fluid enters the phase separator 100 through an inlet 102 and exits from gas outlet 108. A baffle 107 retains the liquids, while the gas is free to be removed via gas outlet 108. Water and oil will form separate layers, allowing water to be removed via water outlet 109, and oil, which flows over baffle 107, is removed via oil outlet 111. The oil and water may be disposed of or treated as desired or required, and will not be discussed further. Three-phase separator 100 is intended to be an initial separator to separate the gas from the bulk of the liquids. However, the gas exiting separator 100 will still be "wet".

Figure 6:
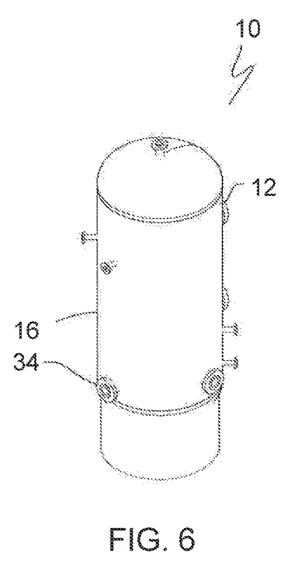
FIG. 6 is a perspective side view of the separator for a gas stream shown in FIG. 1.

Referring to FIG. 6, the gas stream flows from output 108 of tank 100 to inlet 12 in tank 11, which operates as described above. The gas exits through gas outlet 34.

Figure 7:
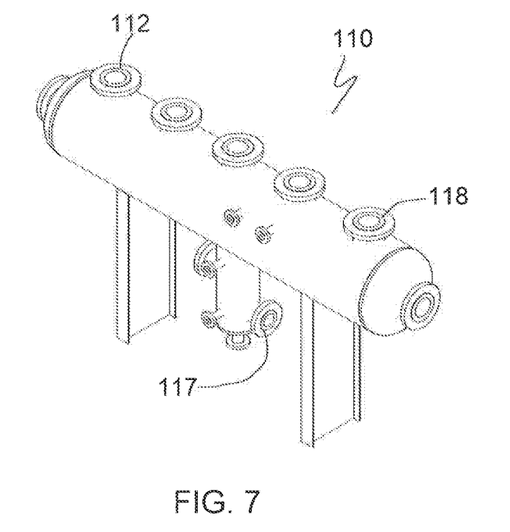
FIG. 7 is a perspective side view of a separator that works in combination with the separator for a gas stream shown in FIG. 1.
Figure 10:
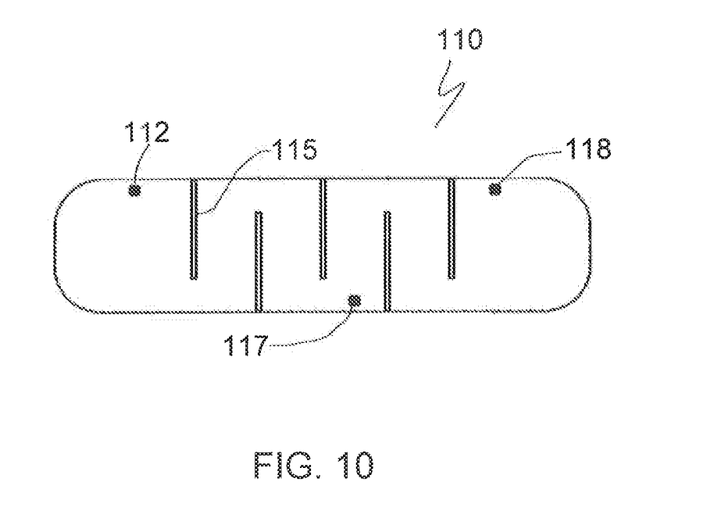
FIG. 10 is a schematic view of a particle bed separator.

Referring to FIG. 7, the gas stream flows from output 34 of tank 11 into another separator, such as a particulate bed separator 110, via an inlet 112. Referring to FIG. 10, a generic particulate bed separator 110 is shown, and includes a horizontal tank in which particulate is present. Separator 110 includes vertical baffles 115 and is at least partially filled with particulate. The vertical baffles (not shown) increase the flow path of the gas stream, come into contact with the gas stream, and redirect the gas stream to create turbulence, each of which reduces the amount of moisture in the gas stream. The baffles generally alternate between being open on the top or bottom of separator 110. Fluids are collected at the bottom of the tank and removed via a liquid outlet 117. The gas stream then exits via outlet 118.

Figure 8:
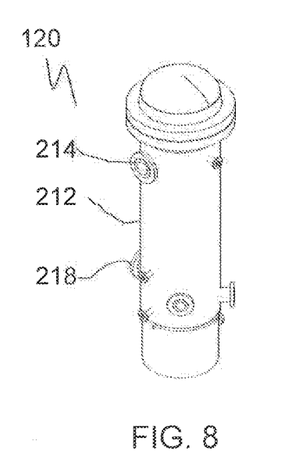
FIG. 8 is a perspective side view of a vortex separator that works in combination with the separator for a gas stream shown in FIG. 1.
Figure 9:
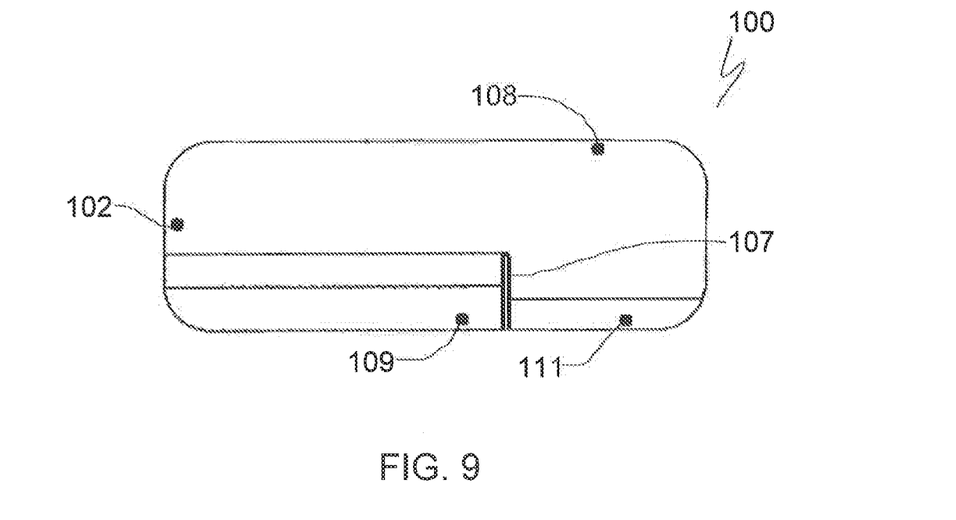
FIG. 9 is a schematic view of a three phase separator.
Figure 11:
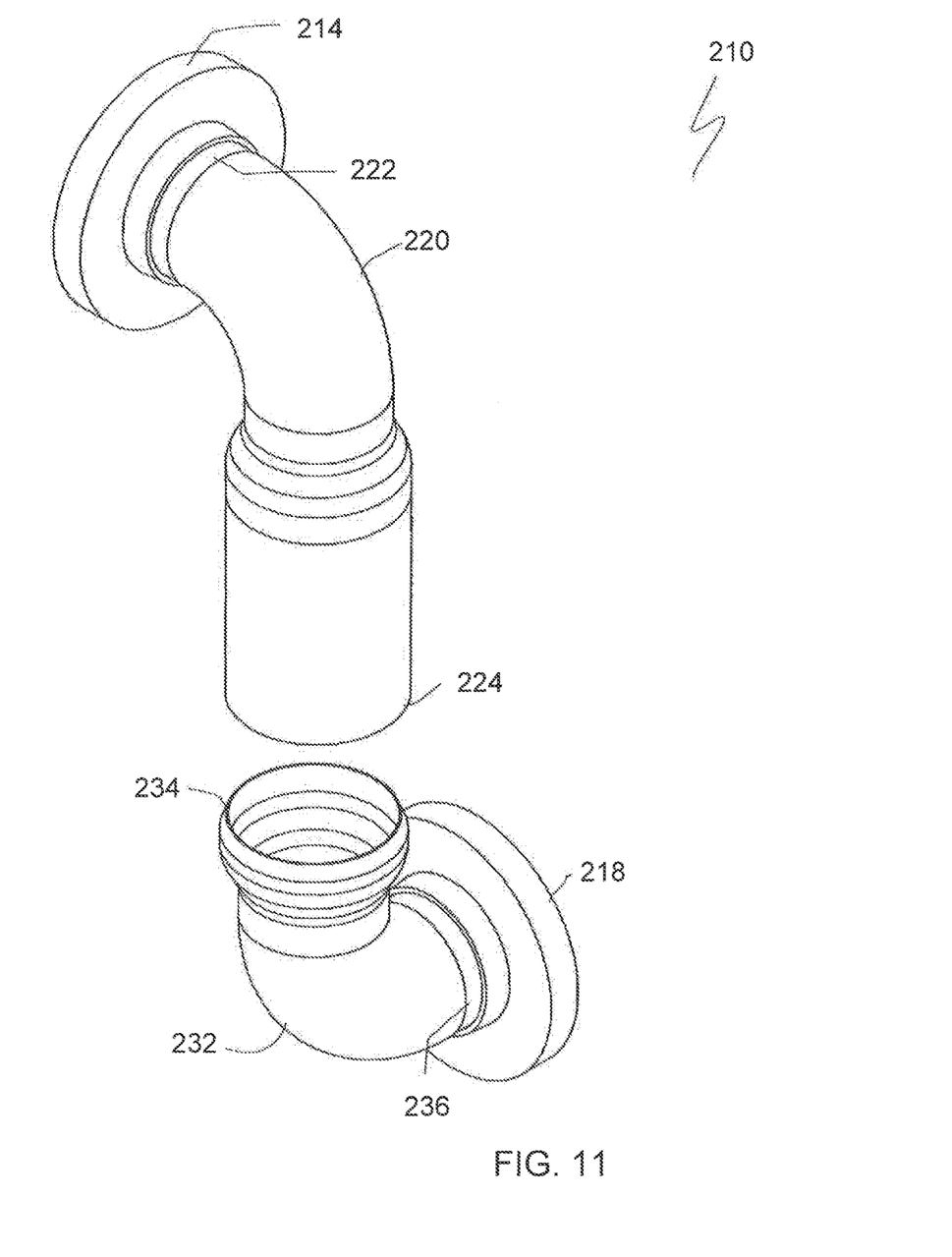
FIG. 11 is a perspective view of the inner pipe of the separator shown in FIG. 8
Figures 12, 13:
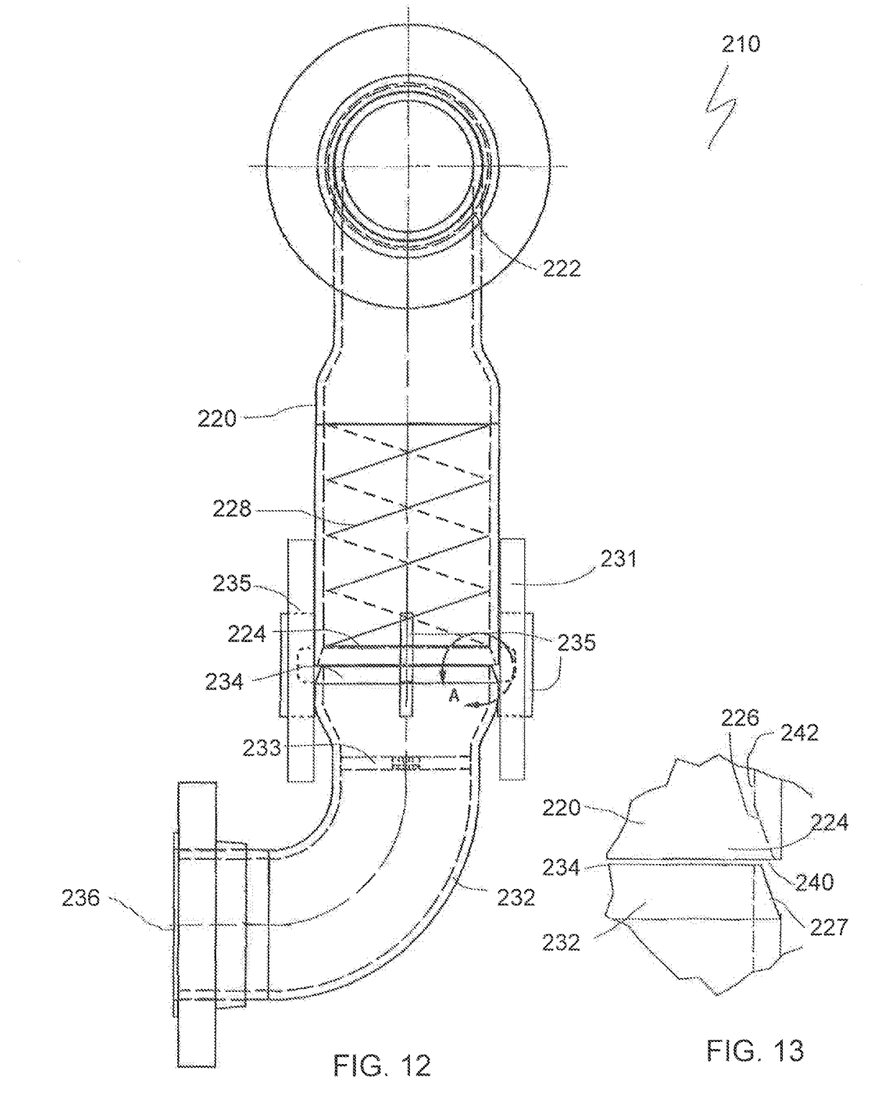
FIG. 12 is a side elevation view in section of the internal pipe of the separator shown in FIG. 8.
FIG. 13 is a detailed side elevation view of section 'A' of FIG. 12.

Referring to FIG. 8, a further separator 120 having an inner separator pipe 210 may then receive the gas stream via inlet 214. Separator pipe 210 is preferably positioned within a tank 212, which has an input 214 for receiving a gas/liquid mixture, a liquid collection area within tank 212 and a gas outlet 218. Referring to FIG. 12, separator 210 has an upper conduit 220 with an inlet 222 and an outlet 224. Upper conduit 220 is preferably installed within tank 212 such that inlet 222 is connected to the input 214 of the tank 212 shown in FIG. 8. Referring to FIG. 11, upper conduit 220 is positioned above a lower conduit 232, which has an inlet 234 in axial alignment with outlet 224 of upper conduit 220 and an outlet 236 connected to gas outlet 218 of the tank 212. Lower conduit 232 is preferably installed within tank 212 such that outlet 236 is connected to gas outlet 218 shown in FIG. 8 and such that inlet 234 is in axial alignment with outlet 224. Preferably, referring to FIGS. 12 and 13, the inner surface 226 of the outlet 224 of the upper conduit 220 is bevelled, and the outer surface 227 of the inlet of the lower conduit 232 is bevelled to assist in the extraction of water collected on an inner surface of upper conduit 220. Preferably, the angle of the bevel is between 10 and 20 degrees. A helical baffle 228 is positioned within the upper conduit 220 and defines a helical flow path in a fixed manner. Helical baffle 228 preferably causes the flow path to make two full rotations to induce a vortex, which causes liquids in the gas to move toward the inner surface of upper conduit 220. Referring to FIG. 13, the inlet 234 of the lower conduit 232 and the output 224 of the upper conduit 220 are separated by a gap 240, such that liquids collected on an inner surface 242 of the upper conduit 220 are ejected from the upper conduit 220. The gap is preferably between 1/20 and 1/8 inches, but may be as high as 1/5 inches. Ejected liquids are ejected out of upper conduit 220 via the gap 240 and into the liquid collection area at the bottom of the tank 212, while the gas within the upper conduit 220 is substantially transferred to the lower conduit 232. Preferably, as shown in FIG. 12, a mist pad 231 is position outside gap 240 to collect the liquid as it is ejected. As liquid is connected on mist pad 231, it will fall to the bottom of tank 212. The position of upper conduit 220 relative to lower conduit 232 is fixed by using gussets 235 that are spaced about conduits 220 and 232.

Figure 14:
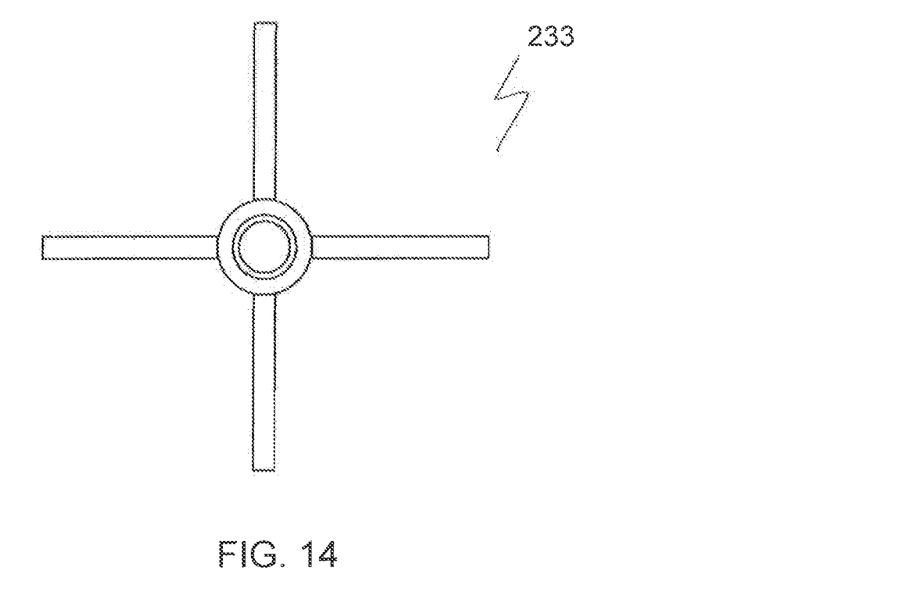
FIG. 14 is a top plan view of a hub found in the separator shown in FIG. 8.
Figure 15:
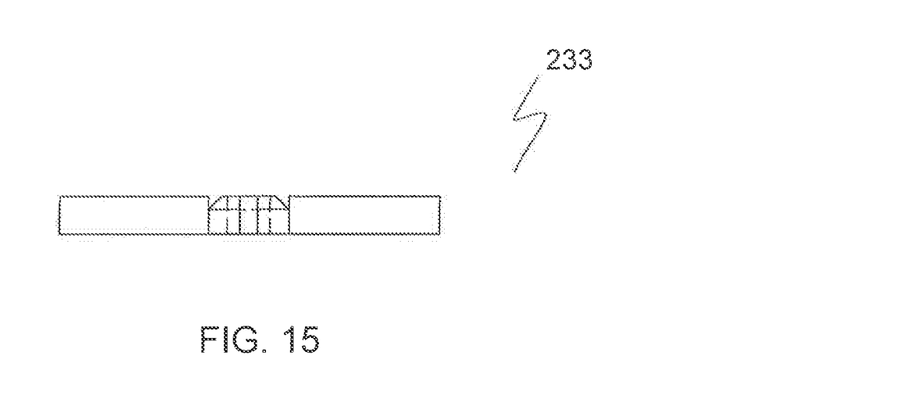
FIG. 15 is a side plan view of the hub found in the separator shown in FIG. 8.

FIGS. 14 and 15 show a hub assembly 233 that is positioned within lower conduit 232.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A separator for a wet gas stream, the separator comprising:
    an upper section having an outer peripheral wall, a top, and a bottom, the bottom comprising a perforated baffle, the top having a gas inlet, and the perforated baffle defining a gas outlet;
    a cone-shaped baffle positioned on the perforated bottom baffle and extending toward the inlet in the top of the upper section;
        a spiral baffle defined by a baffle wall, the baffle wall having a bottom edge adjacent to and following the cone-shaped baffle to define a lower spiral pattern and a top edge adjacent to the top of the upper section, the top edge defining an upper spiral pattern, the spiral baffle defining a curved flow path with a progressively larger radius of curvature and a progressively larger flow area between the inlet and the outlet of the upper portion;
    a vortex flow section defined by the cone-shaped baffle and the outer peripheral wall, the vortex flow section being fed by the curved flow path defined by the cone-shaped baffle;
    a lower section below the perforated baffle, the lower section having a gas outlet and a liquid outlet;
    the upper section comprising a liquid collecting medium positioned toward the outer peripheral wall of the upper section;
    the liquid collecting medium being a mist pad or particulate matter;
    the bottom of the upper section comprising liquid openings into the lower section below the liquid collecting medium; and
    the lower section comprising an outer baffle extending from the bottom of the upper section and positioned between the liquid opening and opening in the perforated baffle.

2. The separator of claim 1, wherein the cone-shaped baffle defines an inner cavity in fluid communication with the lower section.

3. The separator of claim 1, further comprising a cylindrical flange extending downward from the cone-shaped baffle into the lower section, the gas outlet comprising a conduit that terminates within the cylindrical flange.

4. The separator of claim 1, wherein the cone-shaped baffle is a grill.

* * * * *